Patented Mar. 9, 1937

2,073,455

UNITED STATES PATENT OFFICE 2,073,455

FERRO-MAGNETIC ALLOY

Walter E. Remmers, Western Springs, Ill., assignor to Western Electric Company, Incorporated, New York, N. Y., a corporation of New York No Drawing. Application December 1, 1934, Serial No. 755,631

2 Claims. (Cl. 75—128)

This invention relates to ferro-magnetic alloys and methods of making such alloys and more particularly to methods of making cobalt steel alloys.

Magnetic steel alloys are used extensively for permanent magnets and considerable work has been done to improve the magnetic properties of such alloys and reduce their cost.

Objects of the present invention are to provide magnetic steel alloys having good magnetic properties and improved methods of making such alloys.

In accordance with one embodiment of the invention, a small amount of uranium is added to molten cobalt steel to increase the coercive force of the steel and widen its useful hardening temperature range.

The type of ferro-magnetic materials to which this invention particularly relates is cobalt magnet steel which usually contains cobalt from 5% to 40%, carbon from .4% to 1.25%, manganese from .1% to 2.5%, silicon .05% to 1.5%, chromium from 1.5% to 10.0%, tungsten 1.5% to 10.0%, and the balance iron. These percentages refer to the more commonly used cobalt steels for permanent magnets; however, the invention is applicable to permanent magnet cobalt steel including other ingredients and proportions.

In the manufacture of cobalt steel in accordance with this invention, a furnace, such as an arc furnace, may be charged with the proper proportions of scrap steel, cobalt and a high carbon iron, such as washed metal, and the charge melted. Ferro-chromium, ferro-manganese, ferro-silicon and ferro-tungsten are then added to the charge in proportions determined by the character of the scrap steel and the composition of the final product desired. This charge is melted under a suitable slag covering. When the charge and the alloy additions are molten uranium up to 2% or more is added to the charge. It appears that when a charge such as described above is molten, oxygen is dissolved by certain portions of the charge forming on solidification inert materials, poorly magnetic materials and generally deteriorating the steel by solutions of oxides therein and by preventing the proper alloying of the desired constituents. The effect of this not only reduces the amount of magnetic material in a given volume but also decreases the interfacial contact areas of the alloy particles, tending to reduce the coercive force of the final product. In order, therefore, to remove the dissolved oxygen from the molten metal, uranium is added to reduce the oxides. The uranium oxide thus formed, some of which remains in the steel, does not appear to be harmful to the magnetic properties of the steel. A large part of the uranium oxide appears to pass into the slag while some of the uranium remains in the metallic state or forms other compounds to improve the magnetic properties of the steel in addition to the improvement resulting from the decrease of other oxides.

The amount of uranium added is not critical and considerable variations may be made in the amount added. When 2% of uranium is added, it appears by chemical analyses that about .12% remains in the steel under the conditions specified above, the remainder serving as a deoxidizing agent and passing into the slag.

Since the removal of the dissolved oxygen or oxides increases the amount of material in the magnetic state in the alloy, the maximum and residual induction of the alloy will be increased. Also some of the oxides left in the alloy are thrown into the grain boundaries of the alloy and consequently the removal of oxygen from the alloy increases the interfacial contact area between the magnetic particles to increase the coercive force of the alloy.

The molten steel after having been thus treated is usually cast into ingots which are rolled into bars for magnets or the magnets may be cast directly. After the bars are formed or the magnets are cast, they are heated to a temperature which may range from 1500° F. to 1800° F., from which the material is quenched, preferably in oil. Due to the wide temperature range in which this steel may be heat treated, it is less critical and results in a more uniform product.

While the theory above presented is believed to be correct, it is to be understood that the invention is not limited to any particular theory regarding the metallurgical changes which are responsible for the increased magnetic properties.

It will be understood that the embodiment of the invention herein described is merely illustrative and that many changes and modifications may be made therein without departing from the spirit and scope of the invention.

What is claimed is:

1. A permanent magnet steel comprising from 5% to 40% cobalt, .4% to 1.25% carbon, .05% to 1.5% silicon, .1% to 2.5% manganese, 1.5% to 10% chromium, 1.5% to 10% tungsten, approximately .12% uranium, and the balance substantially iron.

2. A permanent magnet steel comprising cobalt 5% to 40%, chromium 1.5% to 10%, tungsten 1.5% to 10%, uranium a substantial amount up to 2% and the balance substantially iron.

WALTER E. REMMERS.